United States Patent
Chajdas et al.

(10) Patent No.: US 12,436,767 B2
(45) Date of Patent: Oct. 7, 2025

(54) SYSTEM AND METHOD FOR SCHEDULING OPERATIONS IN A GRAPHICS PIPELINE

(71) Applicant: Advanced Micro Devices, Inc., Santa Clara, CA (US)

(72) Inventors: Matthäus G. Chajdas, Munich (DE); Michael J. Mantor, Orlando, FL (US); Rex Eldon McCrary, Orlando, FL (US); Christopher J. Brennan, Boxborough, MA (US); Robert Martin, Boxborough, MA (US); Brian Kenneth Bennett, Boxborough, MA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 147 days.

(21) Appl. No.: 18/066,115

(22) Filed: Dec. 14, 2022

(65) Prior Publication Data

US 2024/0202003 A1  Jun. 20, 2024

(51) Int. Cl.
*G06F 9/38* (2018.01)
*G06F 9/48* (2006.01)
*G06T 1/20* (2006.01)

(52) U.S. Cl.
CPC .......... *G06F 9/3836* (2013.01); *G06F 9/3826* (2013.01); *G06F 9/3867* (2013.01); *G06F 9/4881* (2013.01); *G06T 1/20* (2013.01)

(58) Field of Classification Search
CPC .... G06F 9/3826; G06F 9/3873; G06F 9/3836; G06F 9/3858; G06F 9/3867; G06F 9/3885; G06F 3/3824; G06F 9/4881; G06F 9/5038; G06T 1/20

See application file for complete search history.

(56) References Cited

U.S. PATENT DOCUMENTS

| | | | |
|---|---|---|---|
| 7,385,609 B1 * | 6/2008 | Lindholm | G06T 1/20 345/506 |
| 9,176,794 B2 | 11/2015 | Cheng et al. | |
| 9,286,647 B2 * | 3/2016 | Lum | G06T 1/20 |
| 10,460,513 B2 * | 10/2019 | Nijasure | G06T 15/005 |
| 11,107,264 B2 | 8/2021 | Ellis | |

(Continued)

OTHER PUBLICATIONS

International Search Report and Written Opinion in International Application No. PCT/US2023/081181, mailed Mar. 6, 2024, 13 pages.

*Primary Examiner* — Courtney P Spann
(74) *Attorney, Agent, or Firm* — Kowert, Hood, Munyon, Rankin & Goetzel, P.C.; Rory D. Rankin

(57) ABSTRACT

Systems, apparatuses, and methods for implementing a hierarchical scheduling in fixed-function graphics pipeline are disclosed. In various implementations, a processor includes a pipeline comprising a plurality of fixed-function units and a scheduler. The scheduler is configured to schedule a first operation for execution by one or more fixed-function units of the pipeline by scheduling the first operation with a first unit of the pipeline, responsive to a first mode of operation and schedule a second operation for execution by a selected fixed-function unit of the pipeline by scheduling the second operation directly to the selected fixed-function unit, independent of a sequential arrangement of the one or more fixed-function units in the pipeline, responsive to a second mode of operation.

20 Claims, 10 Drawing Sheets

(56) References Cited

U.S. PATENT DOCUMENTS

| | | |
|---|---|---|
| 2012/0229481 A1 | 9/2012 | McCrary et al. |
| 2015/0035854 A1* | 2/2015 | Singh ..................... G06T 11/00 |
| | | 345/619 |
| 2015/0379672 A1* | 12/2015 | Wang ..................... G06T 15/80 |
| | | 345/423 |
| 2016/0132987 A1* | 5/2016 | Li ............................. G09G 5/18 |
| | | 345/522 |
| 2018/0144437 A1* | 5/2018 | Kakarlapudi ......... G06T 15/005 |
| 2019/0087198 A1 | 3/2019 | Frascati et al. |
| 2021/0373892 A1* | 12/2021 | Tovey ................... G06F 9/5038 |
| 2021/0373957 A1 | 12/2021 | Tovey et al. |
| 2022/0188965 A1 | 6/2022 | Li et al. |

\* cited by examiner

SYSTEM AND METHOD FOR SCHEDULING OPERATIONS IN A GRAPHICS PIPELINE

BACKGROUND

Description of the Related Art

Graphics processing pipelines perform a series of steps to convert input geometry into an image for display on a screen. In some examples, these steps are specified as commands by a host such as a central processing unit running an application. Many rendering workloads require large sequences of commands, and thus generating and processing these sequences is a complex task.

Generally, graphical processing pipelines consist of fixed-function units configured to perform a set of dedicated functions in graphics processing units that are designed to support them. Each fixed-function unit typically has a programming abstraction with a series of well-defined and specifically named graphics pipeline stages. However, in graphical pipelines that include multiple fixed-function units integrated into the pipeline, each unit performs set tasks in a sequential manner and there is no way of knowing a status of a particular intermediate task, until the entire pipeline has been traversed by an operation.

In view of the above, improved systems and methods for controlling graphic processing pipelines with fixed-function units are needed.

BRIEF DESCRIPTION OF THE DRAWINGS

The advantages of the methods and mechanisms described herein may be better understood by referring to the following description in conjunction with the accompanying drawings, in which.

DETAILED DESCRIPTION OF IMPLEMENTATIONS

In the following description, numerous specific details are set forth to provide a thorough understanding of the methods and mechanisms presented herein. However, one having ordinary skill in the art should recognize that the various implementations may be practiced without these specific details. In some instances, well-known structures, components, signals, computer program instructions, and techniques have not been shown in detail to avoid obscuring the approaches described herein. It will be appreciated that for simplicity and clarity of illustration, elements shown in the figures have not necessarily been drawn to scale. For example, the dimensions of some of the elements may be exaggerated relative to other elements.

Systems, apparatuses, and methods for implementing scheduling of fixed-function units in a pipeline are disclosed. In various implementations, a processor includes a pipeline comprising one or more fixed-function units, control logic, and a scheduler. The scheduler is configured to schedule one or more operations to the pipeline using a pipeline mode (a first mode) or a direct access mode (a second mode). In the pipeline mode, an operation scheduled for execution by a fixed-function unit of the pipeline enters the pipeline at the head, irrespective of where the fixed-function unit is within the pipeline, and has results that exit the end of the pipeline. In the direct access mode, control logic circuitry may use data from the scheduler to schedule an operation for execution by a selected fixed-function unit of the pipeline by scheduling the operation directly to the selected fixed-function unit without having to enter at the head of the pipeline or otherwise traverse other fixed-function units of the pipeline.

Figure 1:
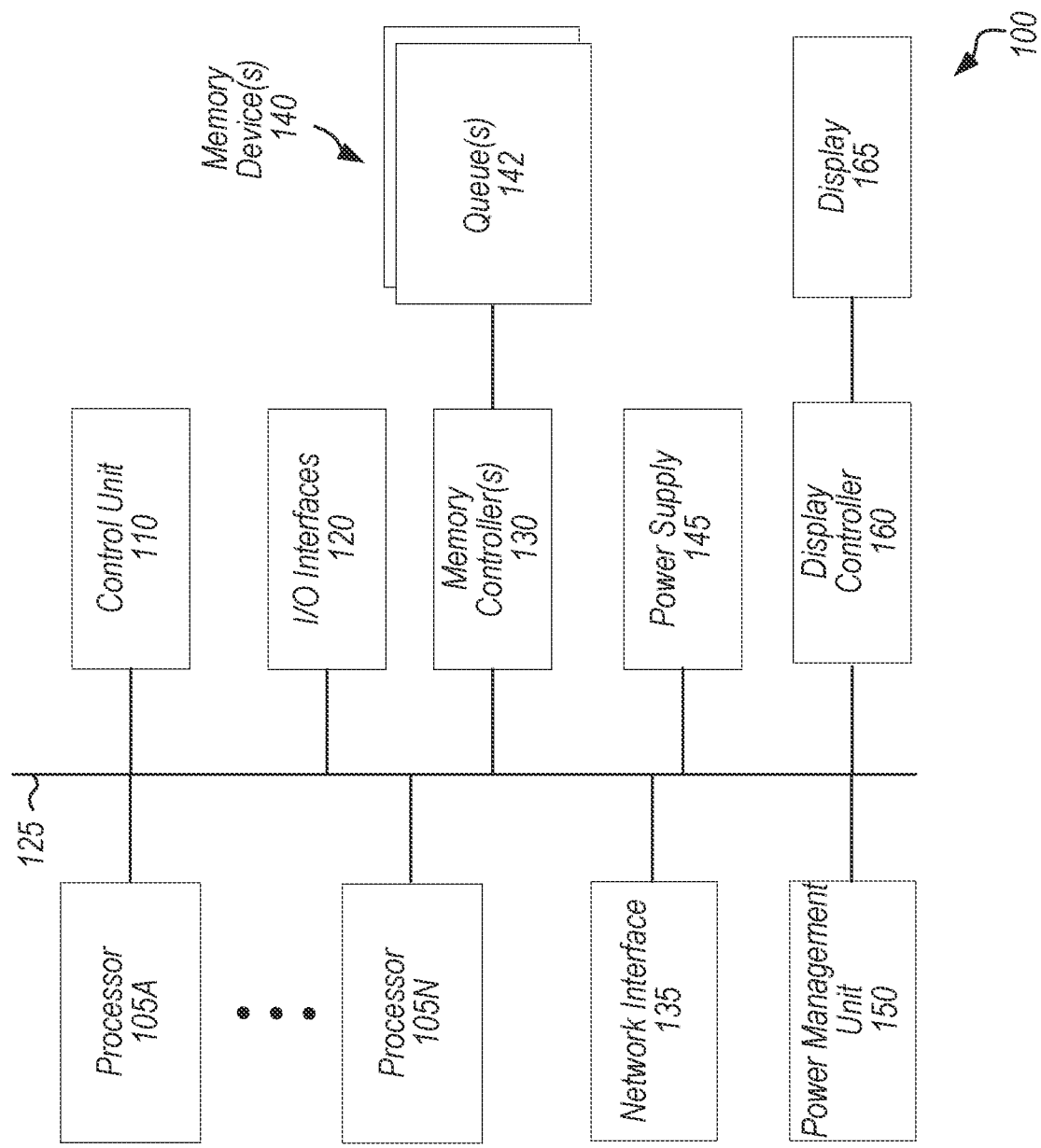
FIG. 1 is a block diagram of one implementation of a computing system.

Referring now to FIG. 1, a block diagram of one implementation of a computing system 100 is shown. In one implementation, computing system 100 includes at least processors 105A-N, control unit 110, input/output (I/O) interfaces 120, bus 125, memory controller(s) 130, network interface 135, memory device(s) 140, power supply 145, power management unit 150, display controller 160, and display 165. In other implementations, computing system 100 includes other components and/or computing system 100 is arranged differently. Processors 105A-N are representative of any number of processors which are included in system 100, with the number of processors varying from implementation to implementation.

In one implementation, processor 105A is a general-purpose processor, such as a central processing unit (CPU). In one implementation, processor 105N is a data parallel processor with a highly parallel architecture. Data parallel processors include graphics processing units (GPUs), digital signal processors (DSPs), field programmable gate arrays (FPGAs), application specific integrated circuits (ASICs), and so forth. In one implementation, processor 105N is a GPU which provides pixels to display controller 160 to be driven to display 165. In some implementations, processors 105A-N include multiple data parallel processors. In one implementation, control unit 110 is a software driver executing on processor 105A. In other implementations, control unit 110 includes control logic which is independent from processors 105A-N and/or incorporated within processors 105A-N. Generally speaking, control unit 110 is any suitable combination of software and/or hardware.

Memory controller(s) 130 is representative of any number and type of memory controllers accessible by processors 105A-N. Memory controller(s) 130 is coupled to any number and type of memory devices(s) 140. Memory device(s) 140 are representative of any number and type of memory devices. For example, the type of memory in memory device(s) 140 includes Dynamic Random Access Memory (DRAM), Static Random Access Memory (SRAM), NAND Flash memory, NOR flash memory, Ferroelectric Random Access Memory (FeRAM), or others.

I/O interfaces 120 are representative of any number and type of I/O interfaces (e.g., peripheral component interconnect (PCI) bus, PCI-Extended (PCI-X), PCIE (PCI Express) bus, gigabit Ethernet (GBE) bus, universal serial bus (USB)). Various types of peripheral devices (not shown) are coupled to I/O interfaces 120. Such peripheral devices include (but are not limited to) displays, keyboards, mice, printers, scanners, media recording devices, external storage devices, network interface cards, and so forth. Network interface 135 is used to receive and send network messages across a network. Bus 125 is representative of any type of bus or fabric with any number of links for connecting together the different components of system 100.

In one implementation, queue(s) 142 are located in memory devices(s) 140. In other implementations, queue(s) 142 are stored in other locations within system 100. Queue(s) 142 are representative of any number and type of queues which are allocated in system 100. In one implementation, queue(s) 142 store rendering tasks that are to be performed for frames being rendered. In one implementation, the rendering tasks are enqueued in queue(s) 142 based on inputs received via network interface 135. For example, in one scenario, the inputs are generated by a user of a video game application and sent over a network (not shown) to system 100. In another implementation, the inputs are generated by a peripheral device connected to I/O interfaces 120.

In one implementation, power management unit 150 manages the supply of power from power supply 145 to components of system 100, and power management unit 150 controls various power-performance states of components within system 100. Responsive to receiving updates from control unit 110, the power management unit 150 causes other components within system 100 to either increase or decrease their current power-performance state. In various implementations, changing a power-performance state includes changing a current operating frequency of a device and/or changing a current voltage level of a device. When the power-performance states of processors 105A-N are reduced, this generally causes the computing tasks being executed by processors 105A-N to take longer to complete.

In one implementation, control unit 110 sends commands to power management unit 150 to cause one or more of processors 105 to operate at a relatively high power-performance state responsive to determining that a number of tasks for the processor exceeds a threshold, needs to meet a certain quality of service requirement, or otherwise.

In various implementations, computing system 100 is a computer, laptop, mobile device, server, or any of various other types of computing systems or devices. It is noted that the number of components of computing system 100 varies from implementation to implementation. For example, in other implementations, there are more or fewer of each component than the number shown in FIG. 1. It is also noted that in other implementations, computing system 100 includes other components not shown in FIG. 1 and/or one or more of the components shown in computing system 100 are omitted. Additionally, in other implementations, computing system 100 is structured in other ways than shown in FIG. 1.

Figure 2:
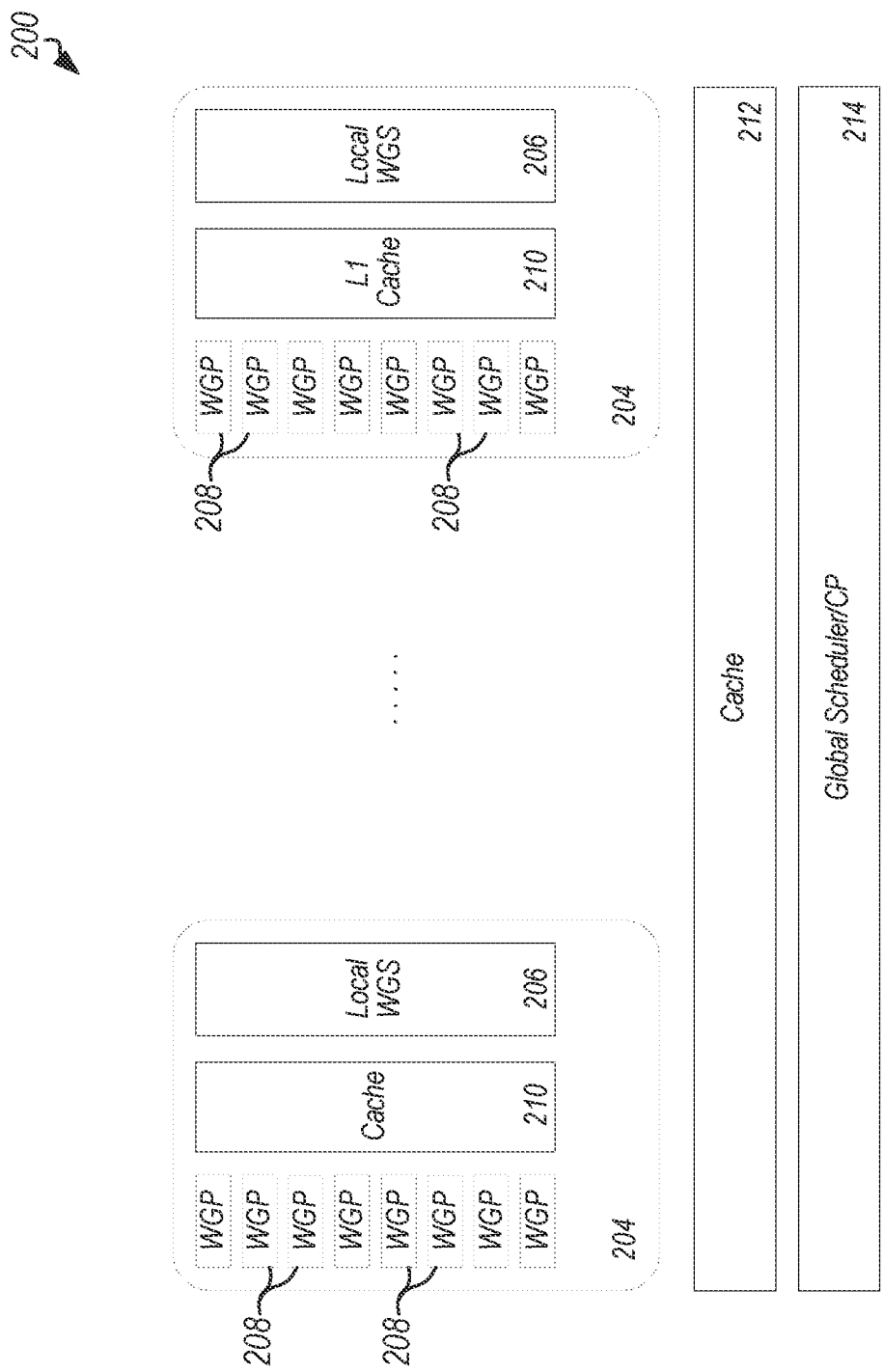
FIG. 2 is a block diagram illustrating a parallel processor implementing hierarchical schedulers.

Turning now to FIG. 2, a parallel processor 200 implementing hierarchical scheduling domains is shown. In an implementation, the parallel processor 200 includes a plurality of scheduling domains 204. Each scheduling domain 204 corresponds to a shader engine. As shown, each shader engine 204 includes a plurality of workgroup processors (WGP) 208, with each including one or more compute units (not shown). Each of the shader engines 208 is configured to execute a plurality of work items received from a command processor (also referred to as a "global scheduler") 214 external to the scheduling domain 204. In an implementation, each scheduling domain further includes a local work-graph scheduler (WGS) 206 (or "scheduler"), and a local cache 210. In various implementations, while each of shader engines 204 includes a local cache 210, cache 212 is shared by the shader engines 204. In this manner, data can be communicated between shader engines 204. In an exemplary implementation, each of the WGS and global scheduler may have access to individual mailboxes that may be used by a given entity to communicate with another entity in the system without the use of a main memory subsystem of the parallel processor 200. In one example, a dedicated mailbox for the global scheduler may be located in cache 212. Further, each WGS 206 may also have a dedicated mailbox, which in one implementation, may be located in cache 210 associated with WGS 206. Other possible locations of the dedicated mailboxes are contemplated and are within the scope of the present disclosure.

In an implementation, the WGS 206 is configured to directly access the local cache 210, thereby avoiding the need to communicate through higher levels of the scheduling hierarchy. In this manner, scheduling latencies are reduced, and a finer grained scheduling can be achieved. That is, WGS 206 can schedule work items faster to the one or more WGP 208 and on a more local basis. Further, the structure of the shader engine 204 is such that a single WGS 206 is available per shader 204, thereby making the shader engine 204 more easily scalable. For example, because each of the shader engines 204 is configured to perform local scheduling, additional shader engines can readily be added to the processor.

In one implementation, a given shader 204 may be used to control one or more fixed-function units, which can be for instance part of a graphics processing pipeline (e.g., graphics pipeline 300 in FIG. 3) comprising multiple fixed-function units, or other processing pipelines comprised of one or more fixed-function units, by exposing a given fixed-function unit to a graph scheduling mechanism via the scheduler 206. In the following discussion, a graphics pipeline may generally be referred to for purposes of discussion. However, the methods and mechanisms described herein are applicable to pipelines other than graphics pipelines, per se. For example, the given fixed-function unit may be externally controlled by the scheduler 206, such that scheduler 206 may notify the fixed-function unit about one or more operations to be executed and commanding the fixed-function unit to write data to a particular memory location (e.g., a dedicated mailbox) or the system memory, the data pertaining to the result of execution of the one or more operations. Further, in another implementation, the scheduler 206 may also obtain information associated with a status of the fixed-function unit, overload or underload of the fixed-function unit, signal error conditions associated with the fixed-function unit, and the like.

In operation, in order to control fixed-function units using the scheduler 206, a given shader 204 may execute a pipeline of one or more fixed function units (e.g., the graphics pipeline, or another pipeline) in different modes of operation. In an implementation, in a first mode of operation, the scheduler 206 may schedule an operation for execution by the pipeline by scheduling the operation for a first fixed-function unit of the pipeline, such that an output of execution of the operation may be utilized as an input by a second fixed-function unit of the pipeline, the second fixed function unit connected to the first fixed function unit in a sequential manner. That is, in the first mode of operation, each operation executed needs to be traversed all fixed-function units of the pipeline, before the scheduler 206 can determine an output of the execution of the operation.

However, in a second mode of operation, scheduler 206 can schedule an operation for a selected fixed-function unit of the pipeline independent of the sequence of fixed-function units in the pipeline. That is, in the second mode of operation, the scheduler can assign an operation for execution directly to a selected fixed-function unit without having to traverse all units of the pipeline sequentially. In order to do so, the scheduler 206 notifies the selected fixed-function unit of execution of the operation using an input data buffer of the selected fixed-function unit. Further, once the operation is executed by the selected fixed-function unit, it can notify the scheduler 206 using a memory subsystem or by writing to a dedicated mailbox accessible by the scheduler 206. In an implementation, the scheduler 206 also notifies the selected fixed-function unit where to send data pertaining to the result of the execution of the operation, e.g., to an input data buffer of another fixed-function unit or to a memory location accessible by another scheduler.

In an implementation, a fixed-function unit can also send push messages to the scheduler 206 and messages may also be pulled from the fixed-function unit by the scheduler 206. Whether messages are pushed or pulled may be dependent on the type of message. For instance, messages indicating completion of execution of an operation 206 may be push messages sent from the fixed-function unit to the scheduler 206. Further, messages indicative of overload or underutilization of the fixed-function unit may be pulled from the fixed-function unit by the scheduler 206.

In an implementation, the flow of data to and from a fixed-function unit may be established by scheduler 206 using a messaging protocol messaging protocol, that may comprise messaging formats for different messages such as messages to schedule operations for execution, notifications that operations have been executed by the fixed-function unit, messages comprising status reports, and the like.

Advantageously, implementing the pipeline such that one or more fixed-function units are controlled using nodes in a scheduling graph may provide for better control of the pipeline while reducing latency in executing one or more operations, since traversing all units of the pipeline for a given operation may not be required. Further, exposing the one or more fixed-function units to memory locations associated with a shader may also facilitate for precise knowledge of overload or underutilization of a fixed-function unit without having to wait for execution of the entire pipeline, thereby increasing efficiency in scheduling of operations.

Figure 3:
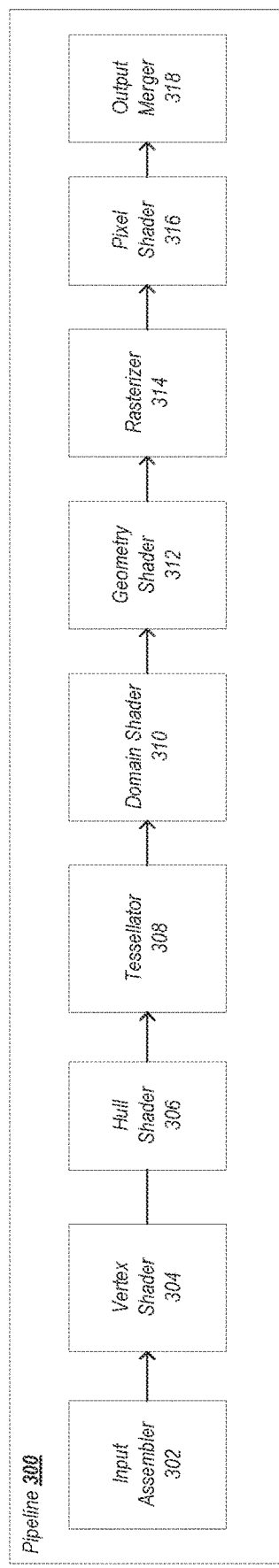
FIG. 3 is a block diagram showing details of an exemplary graphics processing pipeline.

FIG. 3 is a block diagram illustrating an exemplary graphics processing pipeline. The graphics processing pipeline 300 includes one or more fixed-function units that each perform specific functionality of the graphics processing pipeline 300. Each fixed-function unit is implemented partially or fully as fixed-function, non-programmable hardware external to the compute units.

The input assembler 302 reads primitive data from user-filled buffers (e.g., buffers filled at the request of software executed by the processor 200, such as an application) and assembles the data into primitives for use by the remainder of the pipeline. The input assembler 302 can generate different types of primitives based on the primitive data included in the user-filled buffers. The input assembler 302 formats the assembled primitives for use by the rest of the pipeline.

The vertex shader 304 processes vertices of the primitives assembled by the input assembler 302. The vertex shader 304 performs various per-vertex operations such as transformations, skinning, morphing, and per-vertex lighting. Transformation operations include various operations to transform the coordinates of the vertices. These operations include one or more of modeling transformations, viewing transformations, projection transformations, perspective division, and viewport transformations, which modify vertex coordinates, and other operations that modify non-coordinate attributes.

The vertex shader 304 is implemented partially or fully as vertex shader programs to be executed on one or more compute units. The vertex shader programs are provided by the processor 200 and are based on programs that are pre-written by a computer programmer. A driver (not shown) compiles such computer programs to generate the vertex shader programs having a format suitable for execution within the compute units.

The hull shader 306, tessellator 308, and domain shader 310 work together to implement tessellation, which converts simple primitives into more complex primitives by subdividing the primitives. The hull shader 306 generates a patch for the tessellation based on an input primitive. The tessellator 308 generates a set of samples for the patch. The domain shader 310 calculates vertex positions for the vertices corresponding to the samples for the patch. The hull shader 306 and domain shader 310 can be implemented as shader programs to be executed on compute units that are compiled by the driver as with the vertex shader 304.

The geometry shader 312 performs vertex operations on a primitive-by-primitive basis. A variety of different types of operations can be performed by the geometry shader 312, including operations such as point sprite expansion, dynamic particle system operations, fur-fin generation, shadow volume generation, single pass render-to-cubemap, per-primitive material swapping, and per-primitive material setup. In some instances, a geometry shader program that is compiled by the driver and that executes on the compute units performs operations for the geometry shader 312.

The rasterizer 314 accepts and rasterizes simple primitives (triangles) generated upstream from the rasterizer 314. Rasterization consists of determining which screen pixels (or sub-pixel samples) are covered by a particular primitive. The pixel shader 316 calculates output values for screen pixels based on the primitives generated upstream and the results of rasterization. The pixel shader 316 may apply textures from texture memory. Operations for the pixel shader 316 are performed by a pixel shader program that is compiled by the driver and that executes on the compute units.

The output merger 318 accepts output from the pixel shader 316 and merges those outputs into a frame buffer, performing operations such as z-testing and alpha blending to determine the final color for the screen pixels.

Often, processing workloads by the scheduler 206 involves creating multiple "nodes" for scheduling using a scheduling graph. A "node" may be a unit of processing that accepts some input (e.g., from another node or as input to the entire processing workload), processes the input, and generates output. Some outputs include outputs to other nodes, and other outputs include the final output of the processing workload, such as an image to display on a screen. Thus, the particular order of nodes, the inputs those nodes use, and the outputs those nodes generate, specifies an entire processing workload. In an implementation, for execution of operations by fixed-function units of the pipeline 300, the scheduler 206 may generate one or more nodes, having an operation as an input, and schedule each of these nodes to a given fixed-function unit. The nodes may be executed in a sequential manner in a first mode of operation or in a selected non-sequential order in a second mode of operation (as described in FIGS. 4A-4B). That is, based on the mode of operation, the output of a node resultant due to execution of an operation by a first fixed-function unit can be used as an input for a second fixed-function unit of the pipeline in a first mode, or as input for a selected fixed-function unit in a second mode.

Figure 4A:
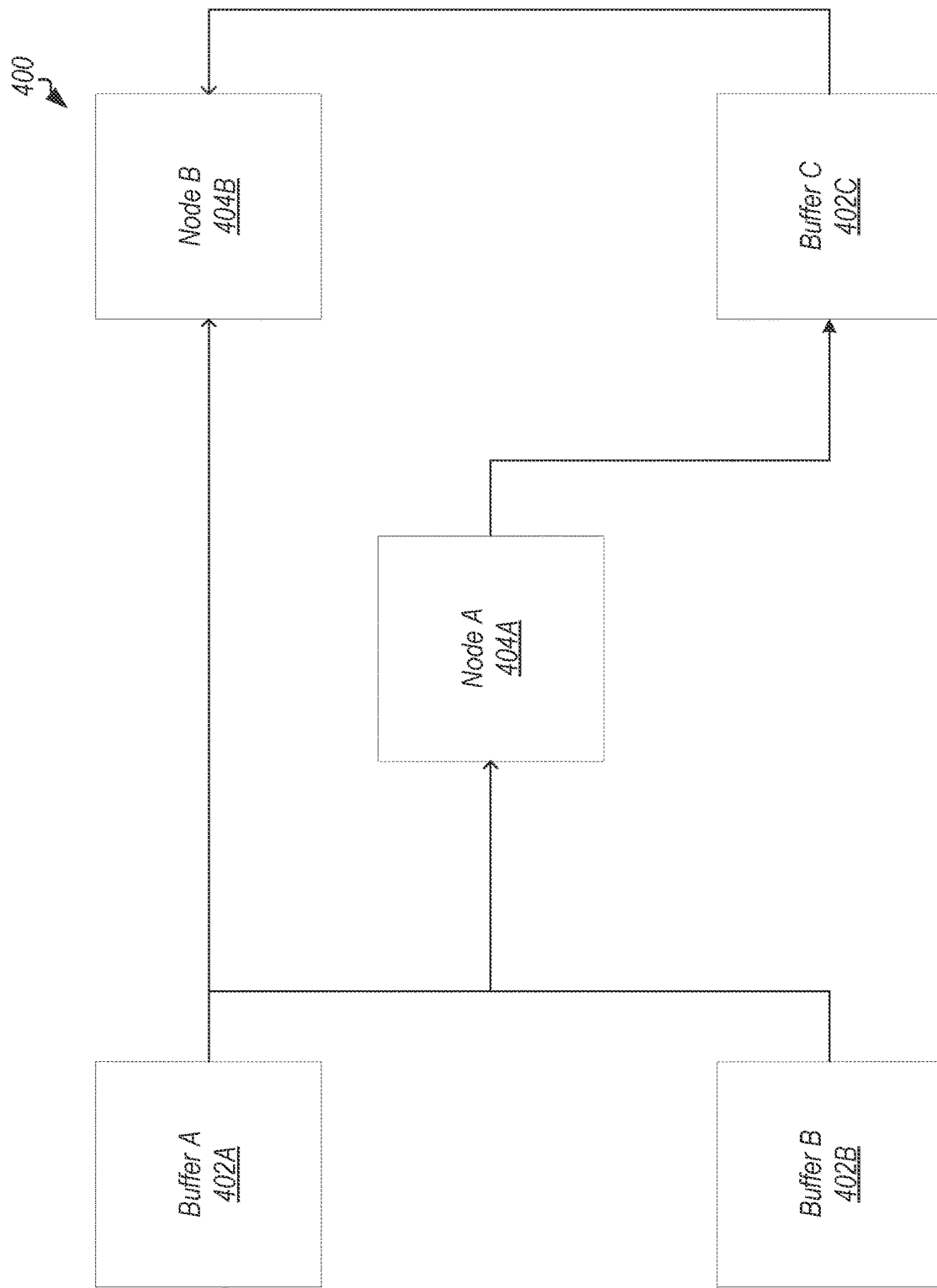
FIGS. 4A and 4B illustrate example scheduler graphs.

Turning now to FIG. 4A, an example task graph 400 for scheduling operations for the graphics pipeline 300, is shown. The task graph 400 specifies a processing workload as a directed acyclic graph of data buffers 402 (or "buffers 402) and nodes 404. The nodes 404, as described above, include specific units of work such as processing of certain data through the graphics pipeline 300 configured in a fixed manner. The data buffers 402 include data that are used as input for nodes 404 and/or as output for nodes 404. A data buffer 402 can be an input to one node 404 and an output to another node 404 or can be an input or output to the entire processing workload (which corresponds to a single task graph). In an implementation, the buffers may include images produced by a particular node 404 through the graphics pipeline 300 or data other than images generated by a node 404 through the graphics pipeline 300.

The task graph 400 includes arrows between buffers 402 and nodes 404. An arrow from a buffer 402 to a node 404 means that the node 404 accepts the data in that buffer 402 as input. An arrow from a node 404 to a buffer 402 means that the node 404 produces the data in the buffer 402 as output. The task graph 400 thus specifies dependencies between nodes 404. More specifically, a node 404 that accepts a buffer 402 generated by another node 404 as input must wait to execute until that buffer 402 has actually been generated. Thus, nodes 404 that accept buffers 402 as input are dependent on other nodes 404 that produce those buffers 402 as output. A first node 404 is also considered dependent on a second node 404 if a third node 404 is dependent on the second node 404 and the first node 404 is dependent on the third node 404. In other words, dependencies propagate through the arrows of the task graph 400. Two nodes 404 are independent if neither is dependent on the other.

As described above, the task graph specification program is a program that specifies how to construct a task graph 400. Thus, a task graph specification program indicates what nodes 404 are to occur and which buffers 402 are the inputs and outputs of the nodes 404. The task graph specification program is able to consider runtime data, such as user-defined runtime data in making decisions regarding whether to include certain nodes 404 and/or buffers 402 in the task graph 400 and how the nodes 404 consume and/or produce the buffers 402. Thus, the task graph specification program is not just a static description of a task graph 400 that gets evaluated by the processor 200. Instead, the task graph specification program is able to variably construct the task graph 400 based on runtime parameters.

Figure 4B:
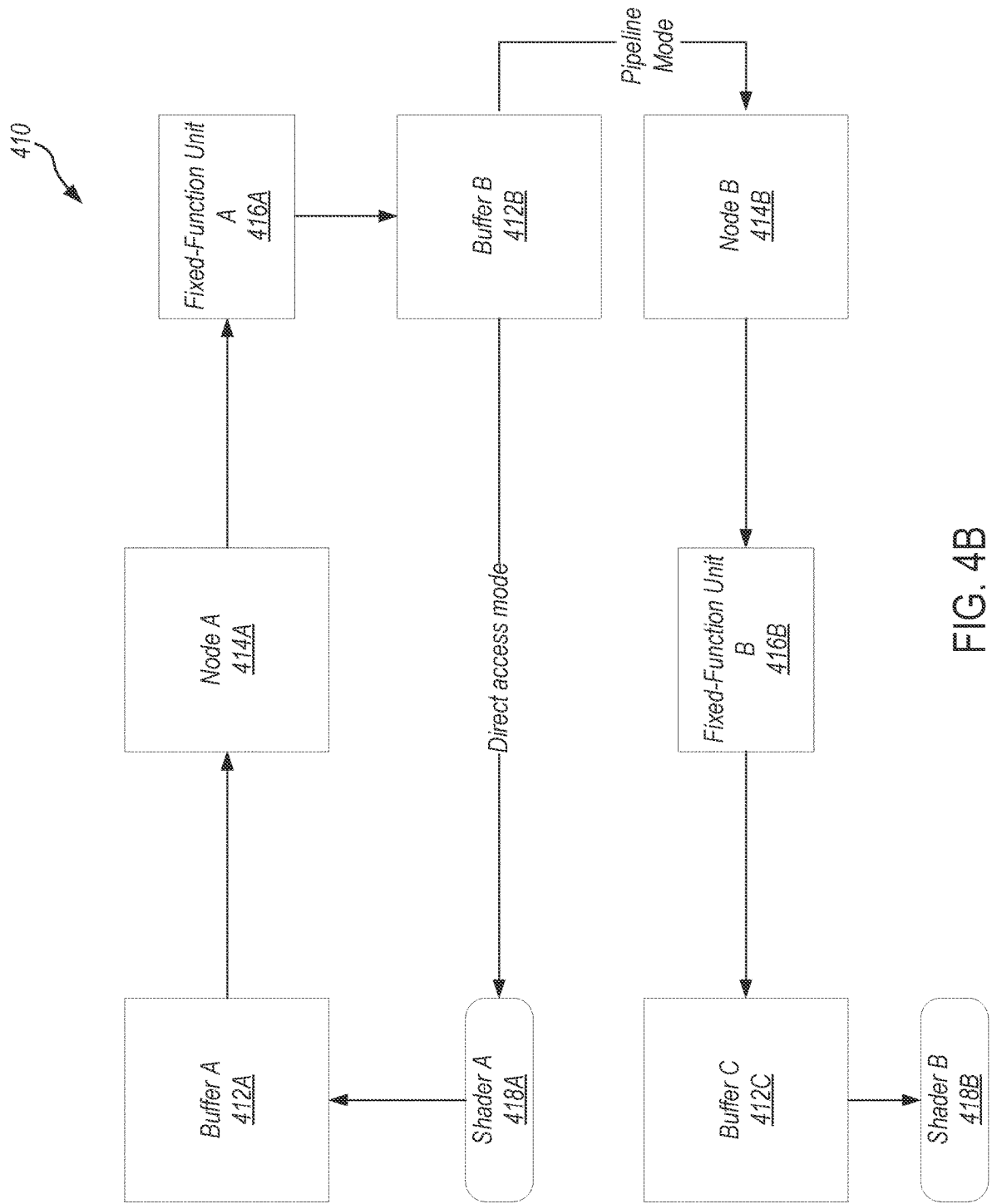

Turning now to FIG. 4B, an example task graph 410 for scheduling operations for the graphics pipeline 300 using hierarchical scheduling, is shown. In an implementation, one or more shaders 418, in a hierarchical scheduling structure as described in FIG. 2, may use the data buffers 412 and nodes 414 to schedule operations directly to fixed-function units 416 independent of the units' sequential order in the pipeline 300. For instance, shader 412A can schedule one or more operations for fixed-function unit 416A by writing data to data buffer 412A as an input for node 414A, which is then fed to the fixed-function unit 416A to be executed. In an implementation, scheduler 206 can write data to the buffer 412A by mapping some special memory or using direct memory access (DMA) for writing the data into buffer 412A. In another implementation, scheduler 206 can also send a pointer to the data in a particular memory location from where it can be read by the fixed-function unit 412A.

As shown in FIG. 4B, in an exemplary implementation, an output generated by fixed-function unit 416A can be accepted as input in buffer 412B. In one implementation, the data in buffer 412B may be utilized based on mode of operation of the processor 200. For instance, in a first mode, this data in buffer 412B is used as input for node 414B, which can be used to schedule an operation for fixed-function unit 416B, wherein fixed-function unit 416B is a unit next to fixed-function unit A in a sequential order of the pipeline 300. That is, in the first mode of operation, i.e., pipeline mode, the output generated from a fixed-function unit is used to generate nodes that act as input to the next fixed-function unit in the sequence of the pipeline 300. When the entire pipeline 300 is traversed, a final output is read by a given shader engine of the processor 200. In an example shown in FIG. 4B, the pipeline 300 may comprise of two fixed-function units 416A and 416B and once both the fixed-function units have completed execution of operations (or data is otherwise traversed through the complete pipeline 300), the output is stored as data in buffer 412C, from where it can be accessed by shader 418B. Although FIG. 4B discusses the pipeline 300 as comprising two fixed-function units, other configurations for pipeline 300 having more fixed-function units are contemplated and within the scope of this disclosure.

In an implementation, in a second mode of operation, i.e., direct access mode, the output from a given fixed-function unit can be accessed by a shader, without having to traverse through all other fixed-function units of the pipeline 300. For example, as shown in FIG. 4B, the output from fixed-function unit 416A (as stored in buffer 412B) can be directly accessed by the shader 418A, without traversing through fixed-function unit 412B and associated nodes and buffers. Further, in the second mode, the shader 418A can also notify the fixed-function unit 416A about a given memory location (i.e., using a memory subsystem or a dedicated mailbox) at which the fixed-function unit 416A can write the data associated with the output. In such a scenario, the fixed-function unit 416A is configured to send an indication to the shader 418A about completion of execution of one or more operations scheduled for the fixed-function unit 416A by the shader 418A. The fixed-function unit 416A also reports its workload status, any error conditions, and other information to the shader 418A.

A given scheduler, using the second mode of operation as described above, is able to control data flow through the task graph 410B and ensure mitigation of issues associated with overloading a specific fixed-function unit. Further, to communicate with each fixed-function unit that a scheduler controls, the scheduler utilizes a messaging protocol with each fixed-function unit, which may comprise of messages to begin execution of work, a notification that work has been executed, and one or more status, as mentioned above.

Figure 5:
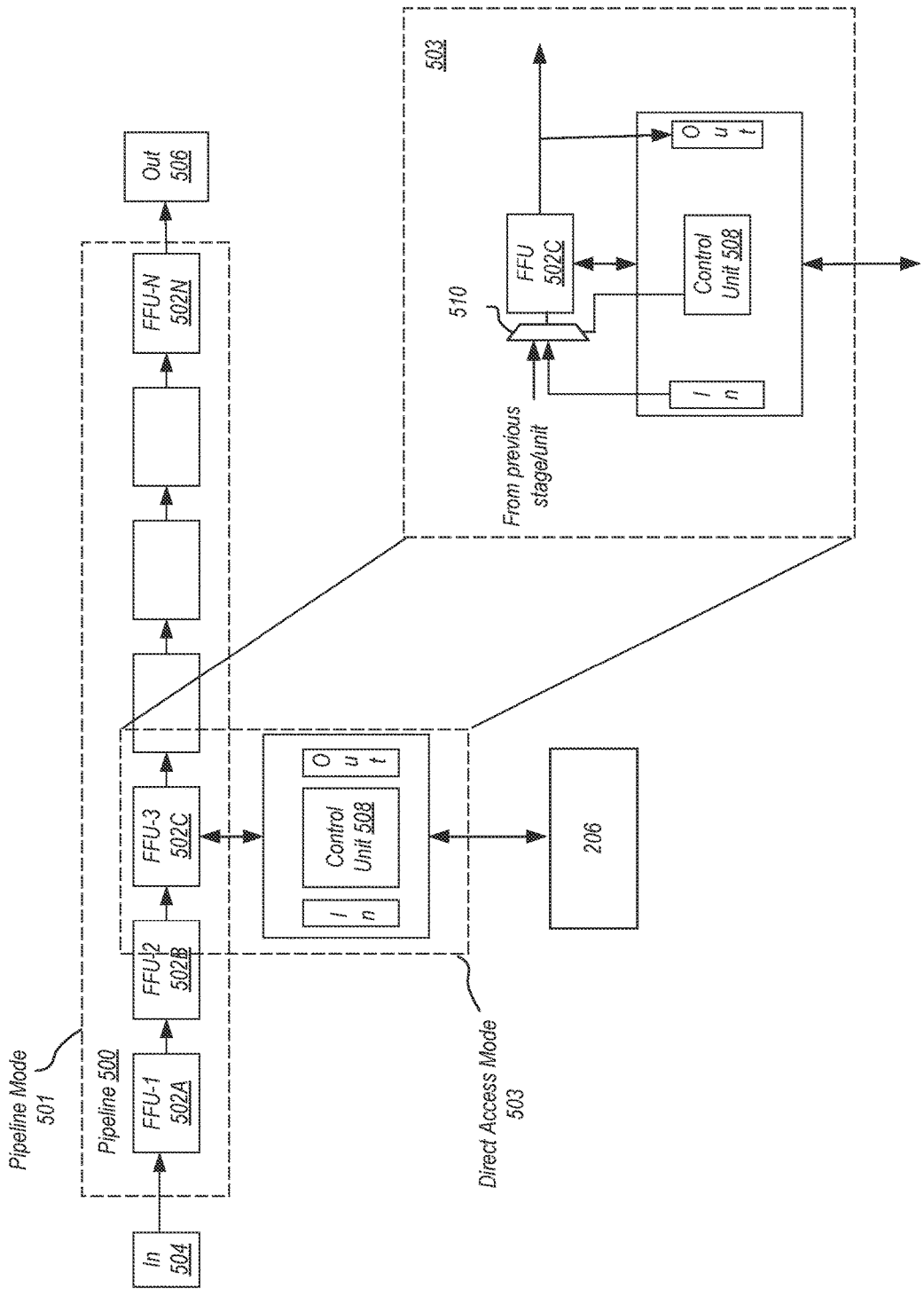
FIG. 5 is a block diagram illustrating control logic for implementing hierarchical scheduling for a pipeline.

Turning now to FIG. 5, an exemplary graphics processing pipeline executing in different modes of operations, is shown. Illustrated in FIG. 5 is a pipeline 500, circuitry 503 associated with a direct access mode, and an enlarged view of one implementation of the direct access circuitry 503. In an implementation, task graphs (e.g., task graph 410) may identify a first operation that generates an output (and stored in a buffer, e.g., buffer 412) that may be consumed by a second operation. Based on the task graph, a scheduler (e.g., scheduler 206) may create one or more command to schedule the first operation to the pipeline 500, a command to store a result of the first operation in a buffer (or memory location), and then a command to perform a second operation that consumes the data from the buffer and creates a new output. The scheduling of the pipeline 500 may be performed in a "pipeline mode" 501 or a "direct access mode" 503 as discussed below. Generally speaking, in pipeline mode data for processing by one of the fixed-function units (502A-502N) enters the pipeline via input 504 at the head (or beginning) of the pipeline 500, and a result of the operation(s) exits via output 506 at the tail (or end) of the pipeline 502). As used herein, a single reference numeral (e.g., 502) followed by a distinguishing letter (e.g., A, B, C) may be collectively referred to by the reference numeral alone (e.g., fixed-function units 502).

In an implementation, graphics pipeline 500 includes one or more fixed-function units 502 (or "FFU" 502) as shown. In an implementation, in the pipeline mode, input operations may be scheduled for the pipeline 500 (e.g., by a scheduler using a scheduling graph as discussed above) by queueing one or more operations in an input queue 504 or other location(s). Further, in the pipeline mode, the output of an operation(s) is produced at the end of the pipeline and stored in an output buffer 506. While operating in pipeline mode 501, one or more of the FFUs 502 may operate on the data. I various scenarios, not all FFUs operate on received data. Rather, a signal or other indication may be provided that indicates whether a given FFU 502 is to operate on received data. If a given FFU 502 is not to operate on received data, the FFU 502 may simply pass the received data on to another FFU 502 (e.g., the next FFU 502 in the pipeline 500). Nevertheless, when operating in pipeline mode, data traverses the pipeline 500 before an output of a given operation is accessible.

As an example, when operating in the pipeline mode, a minimum latency for an execution of an operation includes at least a cumulative number of clock cycles to move received data through the pipeline (e.g., from the input buffer 504, and between each FFU 502), processing of data by FFUs 502 designated to process the data, and movement of the processed data to the output queue 506 of the pipeline 500. Further, in various implementations, while operating in pipeline mode 501 the status of a given operation may be unknown to the scheduler (or other control circuitry), thereby making it difficult to have visibility into when a dependent operation can be scheduled or otherwise.

As an alternative to pipeline mode 501, in various implementations a direct access mode 503 is available. In direct access mode 503, additional circuitry is implemented that allows direct access to one or more of the FFUs 502. How many FFUs 502 are provided with direct access is a matter of design choice. In FIG. 5, one such example of additional circuitry 503 is shown. In the example shown, additional direct access circuitry 503 is shown that includes a control unit 508 as well as storage ("In") for input data that is to be processed and storage ("Out") for output data to store processed data (e.g., input and output buffers). Utilizing this additional circuitry, a scheduler 206 can schedule an operation(s) directly to a selected FFU 502 without the need of traversing other FFUs 502 in the pipeline 500. To this end, as shown in the example in FIG. 5, the control unit 508 may receive data from the scheduler(s) 206 for scheduling one or more operations, directly from a cache or memory associated with the scheduler 206, store said data in an input queue (In), and select an operation from the one or more operations for processing. When the operation is selected, the control unit 508 provides received data directly to the FFU-3 502C without having to first traverse FFU 502A and 502B. That is, each time a new operation is to be scheduled for a FFU 502, the operation may be directly scheduled for the FFU 502, irrespective of execution of other FFUs 502 in the pipeline 500.

Further, for each scheduled operation for FFU 502C, data associated with an output of said operation may also be directly accessed by control unit 508, without waiting for the entire pipeline 500 to finish execution. In the example shown in the figure, control unit 508 may access data associated with an output of an operation scheduled for FFU 502C, directly from the unit (e.g., from output buffer Out), and store said data in its own output queue. This data may then be accessed by a scheduler 206 from the control unit 508's output queue.

In one or more implementations, the control unit 508 may further monitor one or more conditions associated with operation of a given FFU 502. These conditions may include detecting the presence and/or quantity of data received in the input buffer (In), detecting the presence and/or quantity of data in the output buffer (Out), detecting a status of the corresponding FFU (e.g., the FFU is or is not currently busy, the FFU will not be available for a given period of time), a status of execution of one or more operations (e.g., not started, in execution, completed, etc.), overloading or under-utilization of a FFU 502, error states of FFU 502, control signals received from scheduler(s) 206, data associated with operational modes, and otherwise.

As shown in FIG. 5 (enlarged view of direct access circuitry 503 in lower right corner), in some implementations the control unit 508 may further be connected to a multiplexer 510, such that the multiplexer 510 may feed input an FFU 502 from either a previous FFU in the pipeline 500 or directly from the input queue of the direct access circuitry 503. In various implementations, control unit 508 provides a signal to the multiplexer 510 to indicate which data to select based at least in part on the mode of operation (pipeline mode or direct access mode). For instance, the multiplexer may feed data from a previous FFU in the pipeline mode and from the input queue of the control unit 508 in the direct access mode. In an implementation, the control unit 508 may determine the mode of operation based on metadata (or a signal(s)) received from the scheduler 206. For example, the control unit 508 can detect metadata associated with data stored in the input buffer (In) or detect a signal generated by the scheduler 206.

In some scenarios, direct access mode 503 allows a scheduler 206 to directly access a single FFU. In another scenario, direct access mode 503 permits the scheduler to operate the pipeline 500 in a hybrid mode where both a direct access and pipeline mode are used. For example, in such a scenario, the scheduler may schedule an operation to be processed by two or more FFUs 502 with at least one direct access mode operation included. In such a scenario, the scheduler may use direct access mode 503 to directly access a first FFU 502 of the two or more FFUs. When performing the direct access, the scheduler may provide metadata (or signals) that indicate which FFUs are to be used in the operations. As one example, the scheduler 206 may provide a bit vector that includes a bit for each FFU 502 in the pipeline. Such a bit vector may then be provided as metadata along with input data to a given FFU 502. By setting a corresponding bit, the scheduler 206 can indicate which FFUs 502 are to process the data. In various scenarios, the indicated FFUs 502 may or may not be directly coupled in sequence in the pipeline 500. For example, if three FFUs 502 are to process the data, the indicated FFUs 502 may be 502B, 502C, and 502D (i.e., a direct sequence). Alternatively, the indicated FFUs 502 could be 502B, 502D, 502F (i.e., some FFUs 502 in the pipeline 500 do not process). In these scenarios, the first access is a direct access to the initial FFU, while the remaining accesses are in pipeline mode performed by moving the data along the pipeline to a next FFU 502. It is also noted that direct access mode 503 may be used to retrieve the final data instead of waiting for the processed data to traverse the pipeline to the output buffer 506. For example, in a given scenario, the scheduler can directly schedule an operation to FFU-2 where it is scheduled to be operated on by FFU-2 and FFU-3, but then exits the pipeline to a direct access mode buffer after FFU-3. These and other embodiments are possible and are contemplated.

Figure 6A:
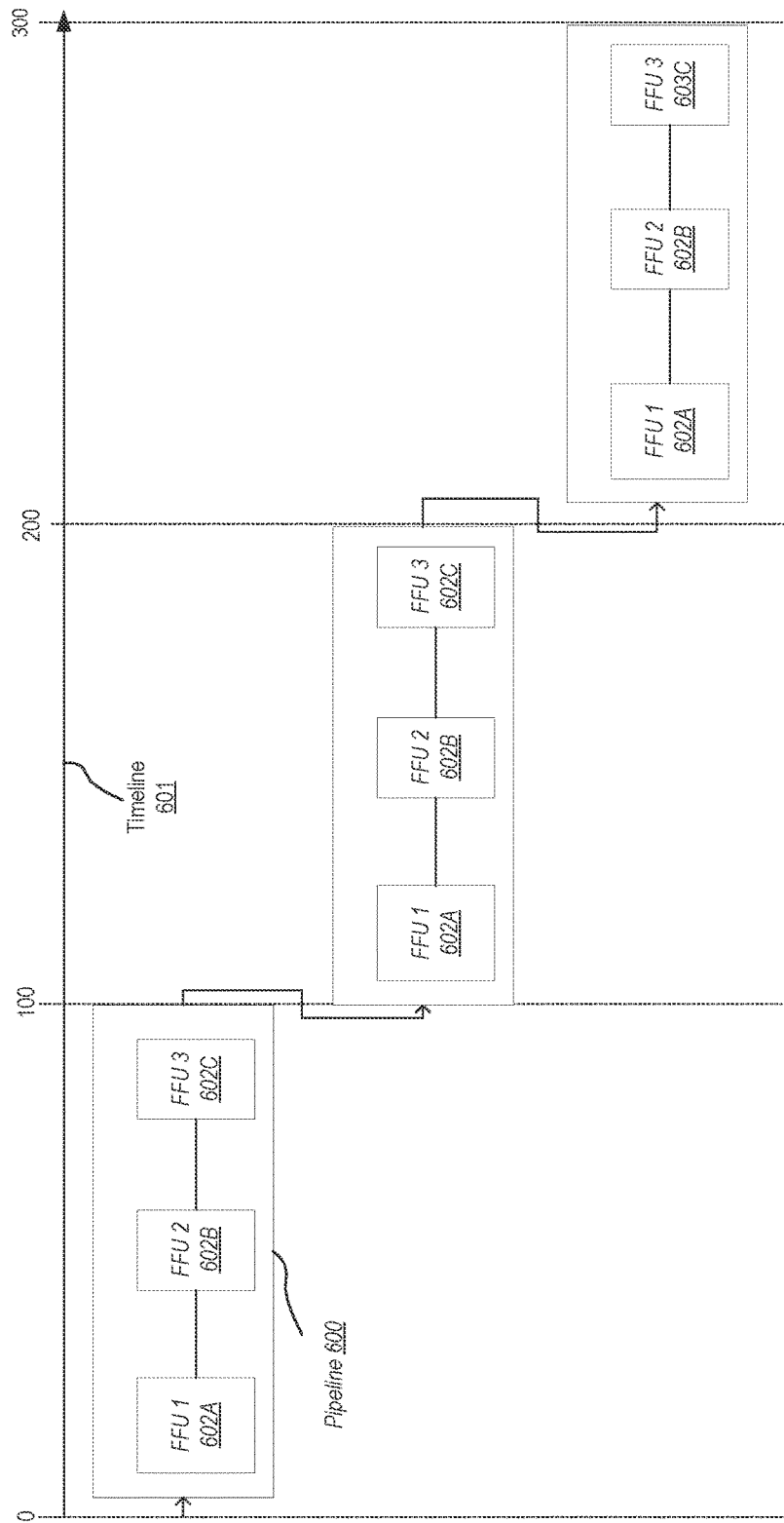
FIGS. 6A and 6B illustrate an exemplary graphics processing pipeline executing in different modes of operations.

Turning now to FIG. 6A, an exemplary operation of the pipeline 600 in the pipeline mode is shown. As described in the foregoing, a minimum latency for an execution of an operation for the pipeline mode can be determined as cumulative amount of clock cycles it takes to clock data from an input queue 504 in a first FFU 502A, processing of data by FFU 502A, and clocking data associated with output of the operation an output queue 506 at the end of the pipeline 600. Conventionally, in the pipeline mode, the data produced as a result of execution of an operation by a given FFU 602 needs to traverse the entire pipeline 600, before it can be accessed by as input to one or more pending scheduled operations, irrespective of which FFUs 602 are enabled or disabled (e.g., bypassed or otherwise passes data to another FFU without processing the data) within the pipeline 600. In an implementation, a scheduler can schedule operations for the pipeline in the pipeline mode using one or more control signals at least in part comprising data associated with an operation and metadata indicating which FFUs 602 need to process the data. For example, each FFU 602 that does not need to process data may simply forward the same to the next FFU 602 in the pipeline 600. However, the data would still be required to traverse through the entire pipeline 600 before it can be accessed at an output queue by the scheduler.

In an example, the minimum latency of the pipeline 600 is assumed to be equal to N clock cycles, wherein N is a positive integer. It is noted that reference to clock cycles is used herein for purposes of discussion, but other units of measure are possible and are contemplated. In the example shown in the figure, the minimum latency of the pipeline is 100 clock cycles. It is noted that other values of clock cycles, e.g., non-integer values are contemplated and within the scope of the present disclosure. In an exemplary implementation, an operation to be executed by any FFU 602 in the pipeline 600 may consume a given number of data clock cycles which may be fixed or could vary. In the example shown in Table 1, a fixed number of clock cycles for FFU 602A may be 50 clock cycles, the number of clock cycles for FFU 602B may be 40 clock cycles, and the number of clock cycles to process data by FFU 602C is 55 clock cycles. In the following examples, it is assumed there are three operations scheduled by the scheduler for execution by at least one FFU 602 of pipeline 600. When the pipeline 600 is operated in the pipeline mode, a first operation scheduled for FFU 602A at N=0 may produce an output that may be accessible at the end of the execution of the complete pipeline 600, i.e., at least the minimum latency of N=100. That is, the pipeline 600 is fully traversed before any output from a given FFU 602 is accessible. This includes scheduling of the first operation at FFU 602A at N=0, processing the first operation by FFU 602A (e.g., using 50 clock cycles), and ultimately accessing the output at the end of the execution of the pipeline 600 at N=100.

In one example, the output of the first operation executed by FFU 602A is used as an input to a pending scheduled operation corresponding to FFU 602B. In such situations, while the pipeline 600 is operated in the pipeline mode, the earliest the scheduling of the second operation for FFU 602B can occur is at N=100. As further depicted in Table 1, the second operation is scheduled at N=100. Time that may be required for moving data that is output from the pipeline 600 to a memory location before being used in a second operation is ignored for simplicity of discussion. Further, since FFU 602B uses 40 clock cycles to process data, and the entire pipeline 600 needs to be traversed before accessing an output of the second operation, output for the second operation is only available at N=200. This is because the output of the first operation retrieved at N=100 is fed back into the input queue of the FFU 602A, time is consumed to move the data through or past FFU 602A, the data is then processed by FFU 602B which takes 40 cycles. Because this example assumes a minimum latency of 100 cycles, the earliest access to the output of this second operation is N=200 cycles. As shown in Table 1, the second operation is scheduled at N=100 and the output is accessed only at N=200. Continuing this example, a later scheduled third operation will consume at least 100 cycles. Consequently, the shortest possible latency for this scenario is 300 clock cycles.

In summary, the pipeline 600 when executed in the pipeline mode needs to execute completely (i.e., traversing of data through all FFUs 502 in sequence), before any output can be accessed. In some scenarios, a particular sequence of operations may be scheduled in the pipeline such that data output from one FFU is used as an input to another FFU. However, when scheduling operations with dependencies at different times as discussed above, the scheduler must wait for the pipeline 600 to complete its execution, access the data, and use the data as input for scheduling another operation. Further, when the given FFU 602 is not the first FFU 602 of the pipeline 600, the scheduler must also wait for all preceding FFUs 602 to process data before an operation can be scheduled for the given FFU 602, thereby resulting in increase in the latency of execution of operations.

Figure 6B:
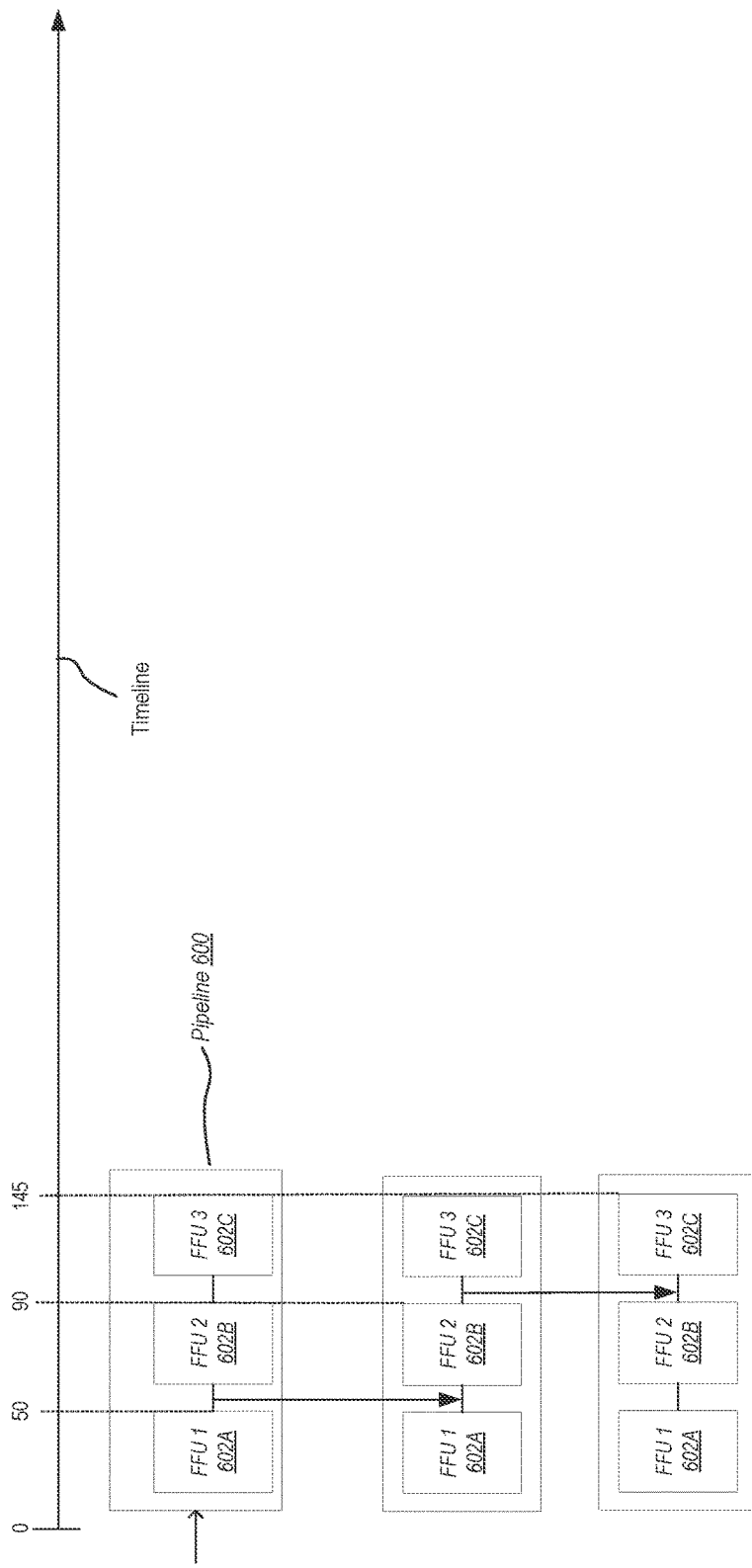

Turning now to FIG. 6B, an exemplary operation of the pipeline 600 in the direct access mode is shown. Using the same example described above, the pipeline 600 has a minimum latency of 100 clock cycles for full traversal, FFU 602A has a processing time of 50 clock cycles for processing data, FFU 602B has a processing time of 40 clock cycles, and FFU 602C has a processing time of 55 cycles. In the direct access mode, a first operation is scheduled for the FFU 602A, at N=0, which takes 50 clock cycles to process data and produce an output. This is in contrast to the pipeline mode where the output had an earliest availability of N=100 cycles.

The control unit (not shown in FIG. 6B) can store the data associated with the output of the first operation in its output buffer, which can be accessed by the scheduler. In an example shown in the figure, this output data can be used to schedule a second operation to FFU 602B. In this case, the scheduler schedules the second operation for the FFU 602B at N=50. As noted above, for simplicity of discussion, time to move data to and from memory, etc., is ignored. As shown in Table 2, the first operation is scheduled at N=0, the output of the first operation is accessed at N=50, and at N=50 the second operation is scheduled for FFU 602B (using the data from the output of the first operation). In the same fashion, for scheduling a third operation for FFU 602C using output from the second operation, the scheduler can directly access data associated with the output of the second operation at N=90, schedule the third operation at the same point in time, and have the final output produced at time N=145 as opposed to N=300 in FIG. 6A.

Such a system of directly accessing individual FFUs 602 may therefore decrease the overall latency of the pipeline 600. Further, the control unit can continuously monitor the status of each FFU 602 during every execution cycle. Further, using the direct access mode, the scheduler may not have to wait for an indication of completion of an execution before starting the next one.

Although the examples in FIGS. 6A and 6B depict execution of FFUs 502 in a sequential manner, in one or more implementations, two or more FFUs 502 may be scheduled concurrently (i.e., for concurrent execution) by scheduler(s) in the direct access mode if there are no dependencies between the operations to be scheduled. For example, at the start of execution, i.e., N=0, the scheduler may schedule both the first operation to FFU 602A and the second operation to FFU 602B, such that execution of both operations is complete by N=50. This may further reduce the overall latency of the pipeline 600.

Figure 7:
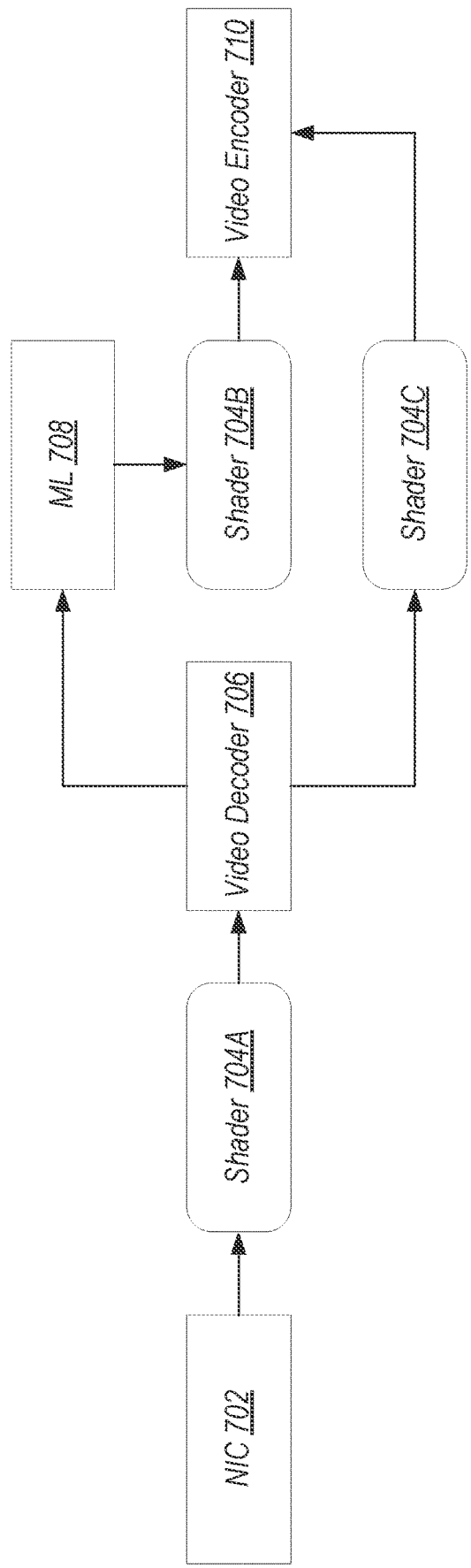
FIG. 7 is a block diagram illustrating an exemplary data flow configuration for a graphics processing pipeline implementing shaders.

Turning now to FIG. 7, a block diagram illustrating an exemplary data flow for a graphics processing pipeline implementing shaders is shown. In an implementation, the pipeline may include fixed-function units such as a NIC 702, video decoder 706, machine learning unit (or "ML unit") 708, and video encoder unit 710. Each of the fixed-function units are controller by shaders 704, such as, shader 704A connected to the NIC 702 and video decoder 706, shader 704B connected to ML unit 708 and video encoder 710, and shader 704C connected to video decoder 706 and video encoder 710.

In one implementation, the NIC 702 may produce one or more work items at a fixed rate. For instance, a network packet(s) comprising data to be processed is received over a network and may be queued by the NIC 702 for execution. The NIC 702 can notify a scheduler (not shown), e.g., as a push notification that work items are ready for execution. In response, the scheduler accesses incoming network packets and once a predetermined number of packets are accumulated, the scheduler can notify the shader 704A to begin processing. In an implementation, the shader 704A produces output based on the notification from the scheduler. For example, the shader 704A can produce a second number of predetermined packets. The shader 704A can then notify the scheduler that an output has been generated.

The produced output from the shader 704A may be input to the video decoder 706. In an implementation, the scheduler may monitor the amount of work items input to each fixed-function block and the next execution is not launched if there is an overload in a given fixed-function block (as opposed to the pipeline mode, wherein no insight into the status of a fixed-function unit may be available). The video decoder 706 may produce output based on the input it received and a notification may be received by the scheduler from the video decoder 706 that the output has been produced and saved in a specific memory location. The scheduler, based on the notification, may read the specific memory location, and store the generated output in a cache (not shown). Based on the output, the video decoder 706 can forward a part of work items to the ML unit 708 to execute, while the remaining work items may be forwarded by the scheduler to shader 704C.

In an implementation, based on the part of work items forwarded to the ML unit 708, it can notify the scheduler which in turns informs the shader 704B when to begin execution. Similarly, the remaining work items are scheduled for the video encoder 710, by the scheduler, by notifying the shader 704C. The video encoder 710 executes the work items received and creates a final output (e.g., an image or video to be presented at a user device), and notifies the scheduler that execution is complete. The scheduler can inform the video encoder 710 a memory location to send the final output to, or discard the output in certain situations. Further, once the execution is complete or the execution results are discarded, the scheduler may recycle each memory location accessed during the execution.

In an implementation, a fixed-function unit (e.g., video decoder 706) may receive one or more work items from a given processor unit (not shown) instead of a given scheduler, thereby enabling the processor unit to drive the fixed-function unit. For instance, when the processor unit drives the fixed-function unit, a given scheduler may only be able to throttle or configure the one or more work items. In the context of the video decoder 706, for example, when the work items pertain to generation of a video, the scheduler may be able to perform change in resolution to adjust a data rate. However, initiation of execution of the work items may still be controlled by the external processor unit.

Figure 8:
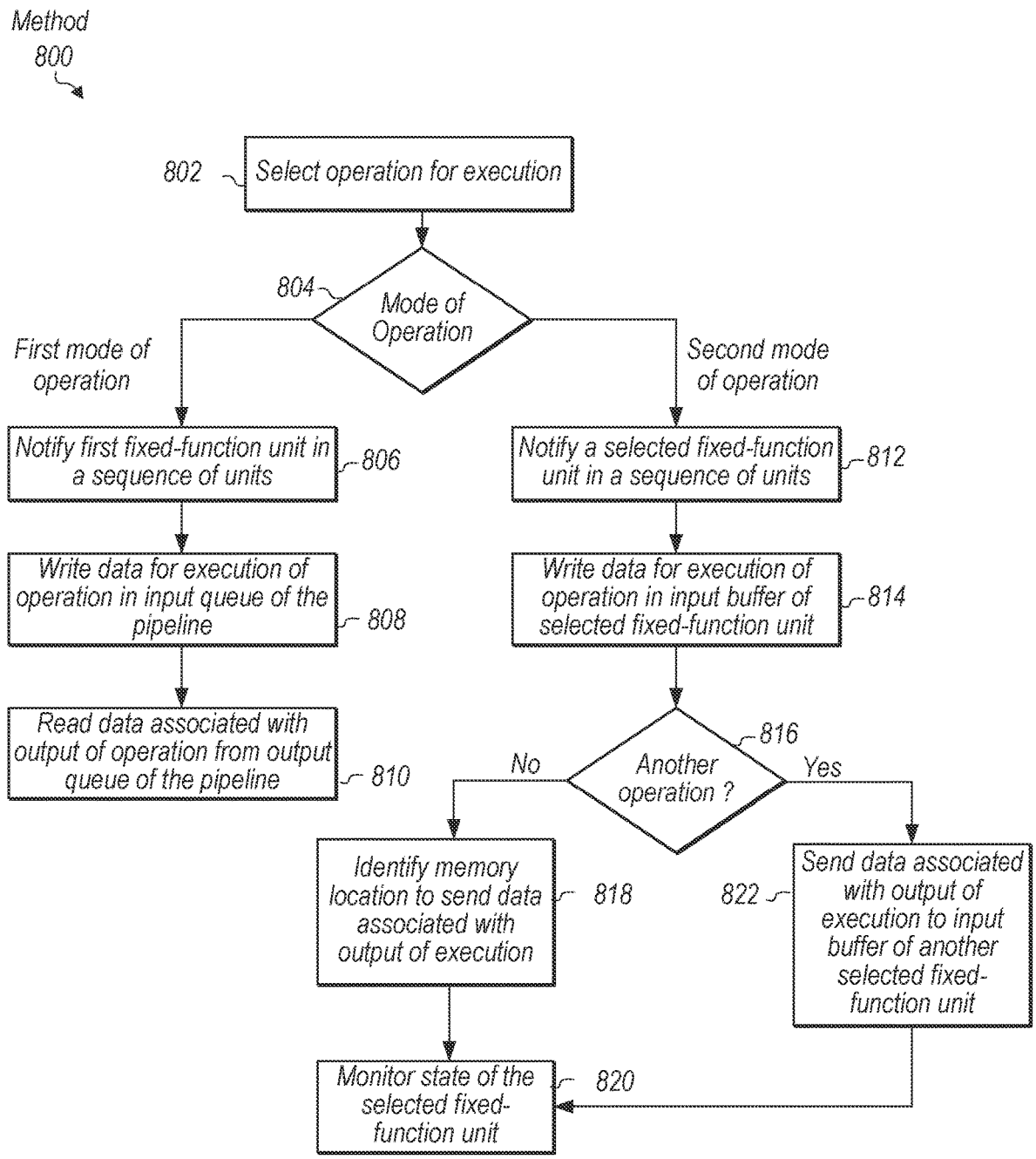
FIG. 8 illustrates a method for scheduling operations to one or more fixed-function units in a pipeline.

Turning now to FIG. 8, one embodiment of a method 800 for controlling one or more fixed-function units in a graphics pipeline, is shown. As described in the foregoing, a control unit (e.g., control unit 508) can select an operation to be executed by the graphics pipeline (block 802). The graphics pipeline, in one implementation, may comprise of one or more fixed-function units such as geometry shader, input assembler, tessellator, rasterizer, video encoder, video decoder, and the like. For instance, when the fixed-function unit is a geometry shader, the operation may be one of point sprite expansion, dynamic particle system operations, fur-fin generation, shadow volume generation, single pass render-to-cubemap, per-primitive material swapping, per-primitive material setup, and the like.

In an implementation, the control unit can select an operation for execution at least in part based on one or more control signals received from the scheduler. In an example, a control signal may include data associated with the operation as well metadata indicating which fixed-function units are required to process said data (i.e., whether pipeline mode or direct access mode be used). The control unit may store the data and associated metadata in its input queue and write the data and metadata to an input buffer of a fixed-function unit based on the mode of operation. Once the operation is selected, the control unit can determine whether the fixed-function unit is to be operated in a first mode (pipeline mode) or a second mode (direct access mode) of operation (conditional block 804).

In case of the first mode of operation ("first mode of operation" leg of conditional block 804), the scheduler can notify a first fixed-function unit from the pipeline about the selected operation (block 806). In an implementation, in the first mode of operation, the control unit determines, based on the data received from the scheduler, that the selected operation is to be executed by the first fixed-function unit of a sequence of fixed-function units comprised in the pipeline. The data pertaining to execution of the selected operation is written to an input queue of the pipeline for execution by the first-fixed-function unit (block 808).

The selected operation may then be executed by the first fixed-function unit and data associated with the output of the execution may traverse to each subsequent fixed-function unit of the pipeline. That is, in the first mode of operation, the data pertaining to the output of the selected operation is only available for access once the execution of the entire pipeline is complete. The control unit may read the data associated with the output from an output queue associated with the pipeline (block 810). In an implementation, this data from the output queue of the pipeline may be read by the control unit and stored in its own output queue, from where it may be accessed by the scheduler.

However, in case of the second mode of operation ("second mode of operation" leg of conditional block 804), the control unit may notify a selected fixed-function unit in a sequence of units comprised in the pipeline (block 812). That is, in the second mode of operation, the control unit can select a given fixed-function unit to execute a given operation (based on data received from scheduler), independent of where that fixed-function unit lies in the sequence of units of the pipeline. The selection of the fixed-function units, in an implementation, can be done based on an application using the pipeline.

Once the selected fixed-function unit is notified, the control unit can write the data for execution of the operation in an input buffer of the selected fixed-function unit (block 814). The control unit can then determine whether another operation is due for scheduling (conditional block 816). In an implementation, one or more other operations may be scheduled by the scheduler, such that each operation may be scheduled for another fixed-function unit (sequential or non-sequential) of the pipeline.

In case it is determined that no other operation is to be scheduled ("no" leg of conditional block 816), the control unit can identify a memory location to which data associated with the output of the execution needs to be sent (block 818). Based on such an identification, the control unit may read the data from the output buffer of the selected fixed-function unit and transmit the data to the identified memory location, once the selected fixed-function unit notifies the control unit that data is ready for consumption. The control unit can then monitor the state of the fixed-function unit and transmit this information to the scheduler (block 820).

However, if the control unit determines, based on the instructions received from the scheduler, that other operations are to be scheduled ("yes" leg of conditional block 816), the control unit can select another fixed-function unit and send the data of the result of execution of the operation to an input buffer of the other selected fixed-function unit (block 822). The control can then again monitor the state of the fixed-function unit (block 820). In an implementation, the scheduler can access workload status, error conditions, data flow, etc. for the fixed-function units, through the control unit, and make scheduling decisions based on this accessed information.

It should be emphasized that the above-described implementations are only non-limiting examples of implementations. Numerous variations and modifications will become apparent to those skilled in the art once the above disclosure is fully appreciated. It is intended that the following claims be interpreted to embrace all such variations and modifications.

What is claimed is:

1. A processor comprising:
   a pipeline comprising one or more fixed-function units comprising circuitry; and
   an output buffer corresponding to the pipeline and configured to store data received from an end of the pipeline; and
   a scheduler comprising circuitry configured to:
      receive a first operation to be executed by a first fixed-function unit of the pipeline;
      cause the first operation to be executed, and generate an output, by the first fixed-function unit;
      retrieve the output from the output buffer, responsive to a first mode of operation; and
      retrieve the output from the first fixed-function unit instead of the output buffer, responsive to a second mode of operation.

2. The processor as recited in claim 1, further comprising control circuitry configured to:
   receive, from the scheduler in an input buffer corresponding to the first fixed-function unit, data for scheduling the first operation;
   transmit the received data to the first fixed-function unit.

3. The processor as recited in claim 2, wherein the control circuitry is further configured to store the output from the first fixed-function unit in an output buffer corresponding to the first fixed-function unit, responsive to the second mode of operation.

4. The processor as recited in claim 3, wherein the control circuitry is further configured to convey the stored output from the output buffer corresponding to the first fixed-function unit to an input buffer corresponding to a second fixed-function unit to schedule a second operation for the second fixed-function unit.

5. The processor as recited in claim 3, wherein the control circuitry is configured to convey data pertaining to the output from the output buffer corresponding to the first fixed-function unit to a memory location, responsive to the second mode of operation.

6. The processor as recited in claim 5, wherein the memory location is one of a memory subsystem associated with the processor, and a mailbox accessible by the scheduler.

7. The processor as recited in claim 1, wherein the first fixed-function unit is configured to send a notification to the scheduler, responsive to the second mode of operation, the notification at least in part indicative of completion of execution of the first operation at the first fixed-function unit.

8. A method comprising:
   receiving, by a scheduler comprising circuitry, a first operation to be executed by circuitry of a first fixed-function unit of a graphics pipeline;
   causing, by the scheduler, the first operation to be executed, and generate an output, by the first fixed-function unit;
   retrieving, by the scheduler responsive to a first mode of operation, the output from an output buffer corresponding to the graphics pipeline and configured to store data received from an end of the graphics pipeline; and
   retrieving, by the scheduler, the output from the first fixed-function unit instead of the output buffer, responsive to a second mode of operation.

9. The method as recited in claim 8, further comprising:
   receiving, by control circuitry in an input buffer corresponding to the first fixed-function unit, data for scheduling the first operation to the first-fixed function unit; and
   transmitting, by the control circuitry, the received data to the first fixed-function unit.

10. The method as recited in claim 9, further comprising storing, by the control circuitry, the output from the first fixed-function unit in an output buffer corresponding to the first-fixed function unit, responsive to the second mode of operation.

11. The method as recited in claim 9, further comprising conveying, by the control circuitry, the stored output from the output buffer corresponding to the first fixed-function unit to an input buffer corresponding to a second fixed-function unit to schedule a second operation for the second fixed-function unit.

12. The method as recited in claim 10, further comprising, conveying, by the control circuitry, data pertaining to the output from the output buffer corresponding to the first fixed-function unit to a memory location.

13. The method as recited in claim 12, wherein the memory location is one of a memory subsystem, and a mailbox accessible by the scheduler.

14. The method as recited in claim 9, further comprising, receiving, by the scheduler, a notification from the first fixed-function unit, responsive to the second mode of operation, the notification at least in part indicative of completion of execution of the first operation.

15. A computing system comprising:
a central processing unit comprising circuitry;
a graphics processing unit comprising circuitry, the graphics processing unit comprising:
  a pipeline comprising one or more fixed-function units, each comprising circuitry; and
  a scheduler comprising circuitry configured to:
    receive a first operation to be executed by a first fixed-function unit of the pipeline;
    cause the first operation to be executed, and generate an output, by the first fixed-function unit;
    retrieve, responsive to a first mode of operation, the output from an output buffer corresponding to the pipeline, and configured to store data received from an end of the pipeline; and
    retrieve the output from the first fixed-function unit instead of the output buffer, responsive to a second mode of operation.

16. The computing system as recited in claim 15, further comprising control circuitry configured to:
  receive, from the scheduler in an input buffer corresponding to the first fixed-function unit, data for scheduling the first operation;
  transmit the received data to the first fixed-function unit.

17. The computing system as recited in claim 16, wherein the control circuitry is further configured to store the output from the first fixed-function unit in an output buffer corresponding to the first-fixed function unit, responsive to the second mode of operation.

18. The computing system as recited in claim 17, wherein the control circuitry is further configured to convey the stored output from the output buffer corresponding to the first fixed-function unit to an input buffer corresponding to a second fixed-function unit to schedule a second operation for the second fixed-function unit.

19. The computing system as recited in claim 17, wherein the control circuitry is configured to convey data pertaining to the output from the output buffer corresponding to the first fixed-function unit to a memory location, responsive to the second mode of operation.

20. The computing system as recited in claim 19, wherein the memory location is one of a memory subsystem, and a mailbox accessible by the scheduler.

* * * * *